(12) United States Patent
Tawes et al.

(10) Patent No.: US 10,102,779 B2
(45) Date of Patent: Oct. 16, 2018

(54) REMOVABLE AND REUSABLE PROTECTIVE ENVELOPE TO DISPLAY DOCUMENT

(71) Applicant: ACCELERATED PRODUCTIONS, INC., Smithfield, VA (US)

(72) Inventors: Joshua Tawes, Smithfield, VA (US); Joel Tawes, Chesterfield, VA (US); Anthony Stile, Smithfield, VA (US); Britt Hawrylak, Fort Worth, TX (US); Matthew Hawrylak, Fort Worth, TX (US); Ray M. Hawrylak, Fort Worth, TX (US); Joseph Cagle, Smithfield, VA (US); Benjamin L. Brown, Newport News, VA (US)

(73) Assignee: Accelerated Productions, Inc., Smithfield, VA (US)

( * ) Notice: Subject to any disclaimer, the term of this patent is extended or adjusted under 35 U.S.C. 154(b) by 0 days.

(21) Appl. No.: 15/893,149

(22) Filed: Feb. 9, 2018

(65) Prior Publication Data
US 2018/0233071 A1    Aug. 16, 2018

Related U.S. Application Data

(60) Provisional application No. 62/458,192, filed on Feb. 13, 2017, provisional application No. 62/541,336, (Continued)

(51) Int. Cl.
*G09F 3/18*    (2006.01)
*G09F 7/18*    (2006.01)

(52) U.S. Cl.
CPC ........ *G09F 7/18* (2013.01); *G09F 2007/1865* (2013.01)

(58) Field of Classification Search
CPC ................................ G09F 2007/1865
(Continued)

(56) References Cited

U.S. PATENT DOCUMENTS

| 3,204,760 A | * | 9/1965 | Whiteford | B65D 75/30 |
| | | | | 206/484 |
| 3,826,026 A | * | 7/1974 | Bevan | G09F 7/04 |
| | | | | 40/591 |

(Continued)

OTHER PUBLICATIONS

International Search Report and Written Opinion for PCT Appl. No. PCT/US2018/017677, dated Apr. 26, 2018, 9 pages.

*Primary Examiner* — Joanne Silbermann
(74) *Attorney, Agent, or Firm* — Patent Law of Virginia, PLLC; Brian J. Teague

(57) ABSTRACT

A device for displaying a document comprises a front transparent planar sheet and a rear planar sheet, each sheet having three edges that are coterminous with and permanently affixed to a corresponding edge of the other sheet, thereby forming an envelope having three sealed edges and an open end. The device further comprises an adhesive strip affixed to either the front sheet or the rear sheet and positioned across the open end between the front and rear sheets to selectively seal the open end, an interior edge seal positioned interiorly to the three sealed edges, thereby forming a double edge seal along the three sealed edges, and a first corner seal and a second corner seal, each extending onto but not all the way through the adhesive strip on opposite ends of the open end.

24 Claims, 8 Drawing Sheets

Related U.S. Application Data filed on Aug. 4, 2017, provisional application No. 62/545,715, filed on Aug. 15, 2017, provisional application No. 62/597,019, filed on Dec. 11, 2017.

(58) Field of Classification Search
USPC ......... 40/661; 383/33, 93, 106, 107; 229/71, 229/74
See application file for complete search history.

(56) References Cited

U.S. PATENT DOCUMENTS

| | | | | |
|---|---|---|---|---|
| 4,864,755 | A | * | 9/1989 | Owens .................... G09F 3/203 |
| | | | | 40/594 |
| 5,290,067 | A | | 3/1994 | Langen |
| 6,048,098 | A | | 4/2000 | Vetter |
| 6,267,505 | B1 | | 7/2001 | Henson |
| 6,517,242 | B1 | * | 2/2003 | Buchman .............. B65B 61/188 |
| | | | | 383/107 |
| 9,533,813 | B1 | | 1/2017 | Conrad |
| 2002/0116854 | A1 | | 8/2002 | Rappaport |
| 2003/0202717 | A1 | * | 10/2003 | Schneider ............... B65B 9/045 |
| | | | | 383/5 |
| 2004/0264813 | A1 | | 12/2004 | Steffens |
| 2005/0016888 | A1 | | 1/2005 | Mandeltort |
| 2009/0050254 | A1 | | 2/2009 | Goto |
| 2010/0247002 | A1 | * | 9/2010 | Ross .................... B65F 1/0006 |
| | | | | 383/75 |
| 2016/0083142 | A1 | | 3/2016 | Mota |

* cited by examiner

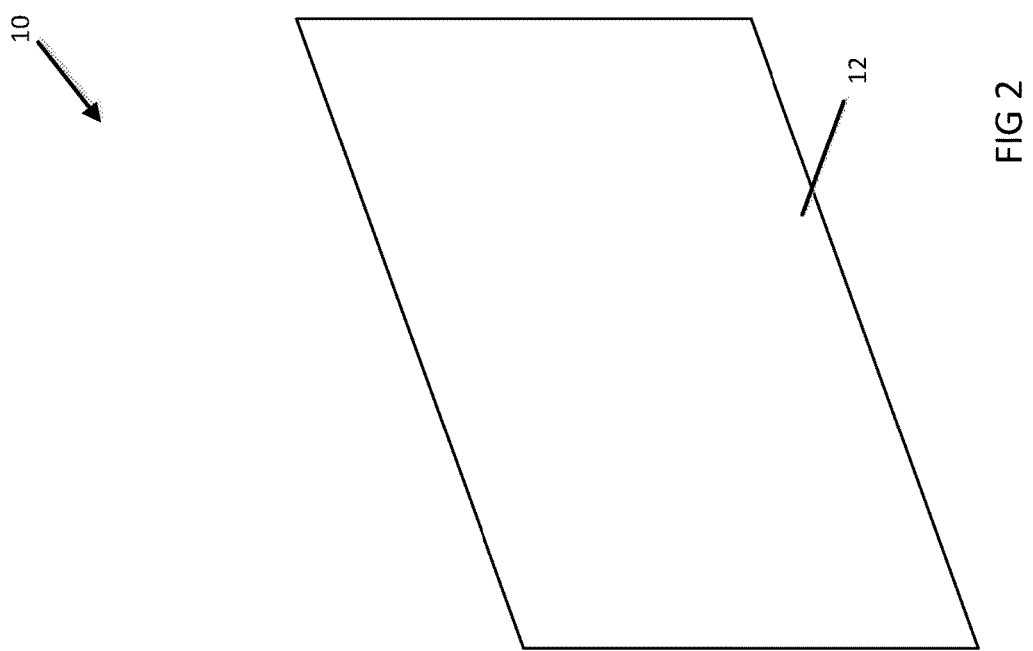
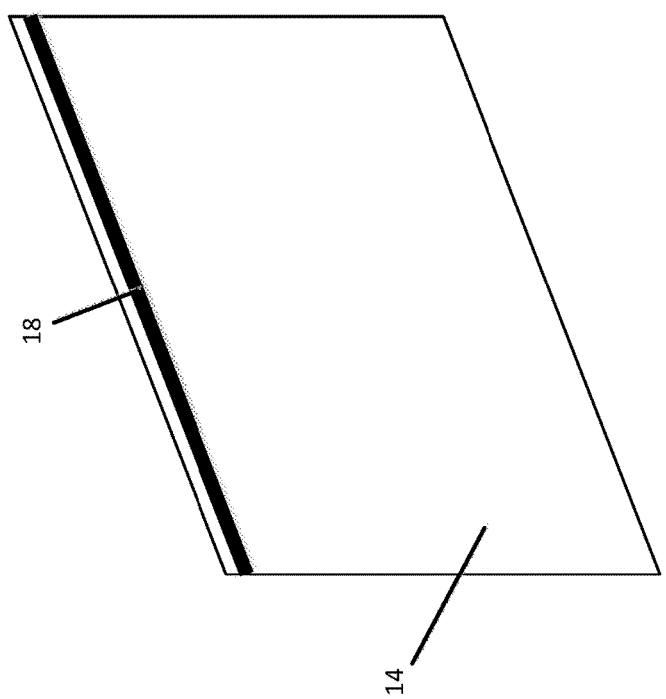
FIG 2

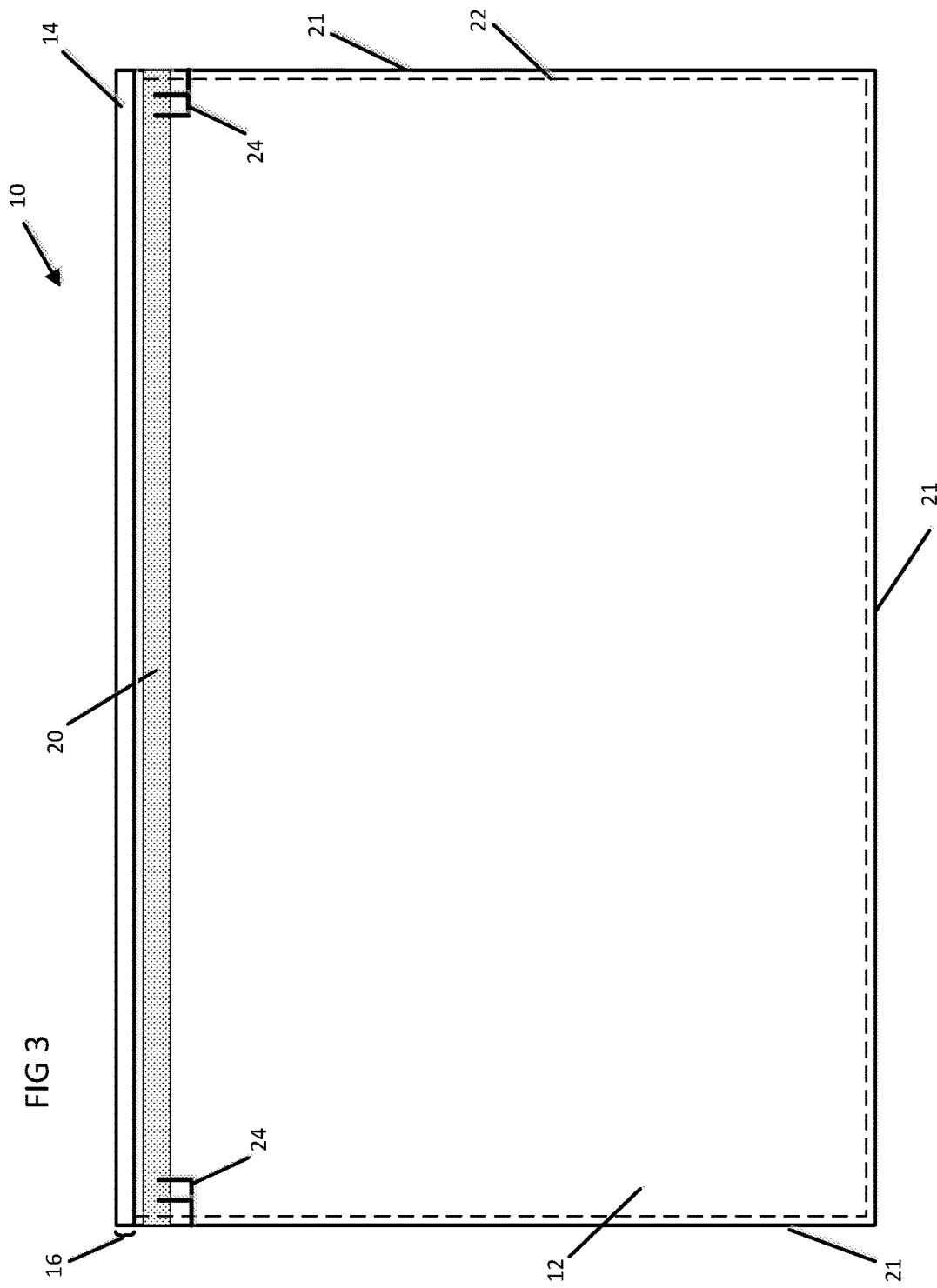

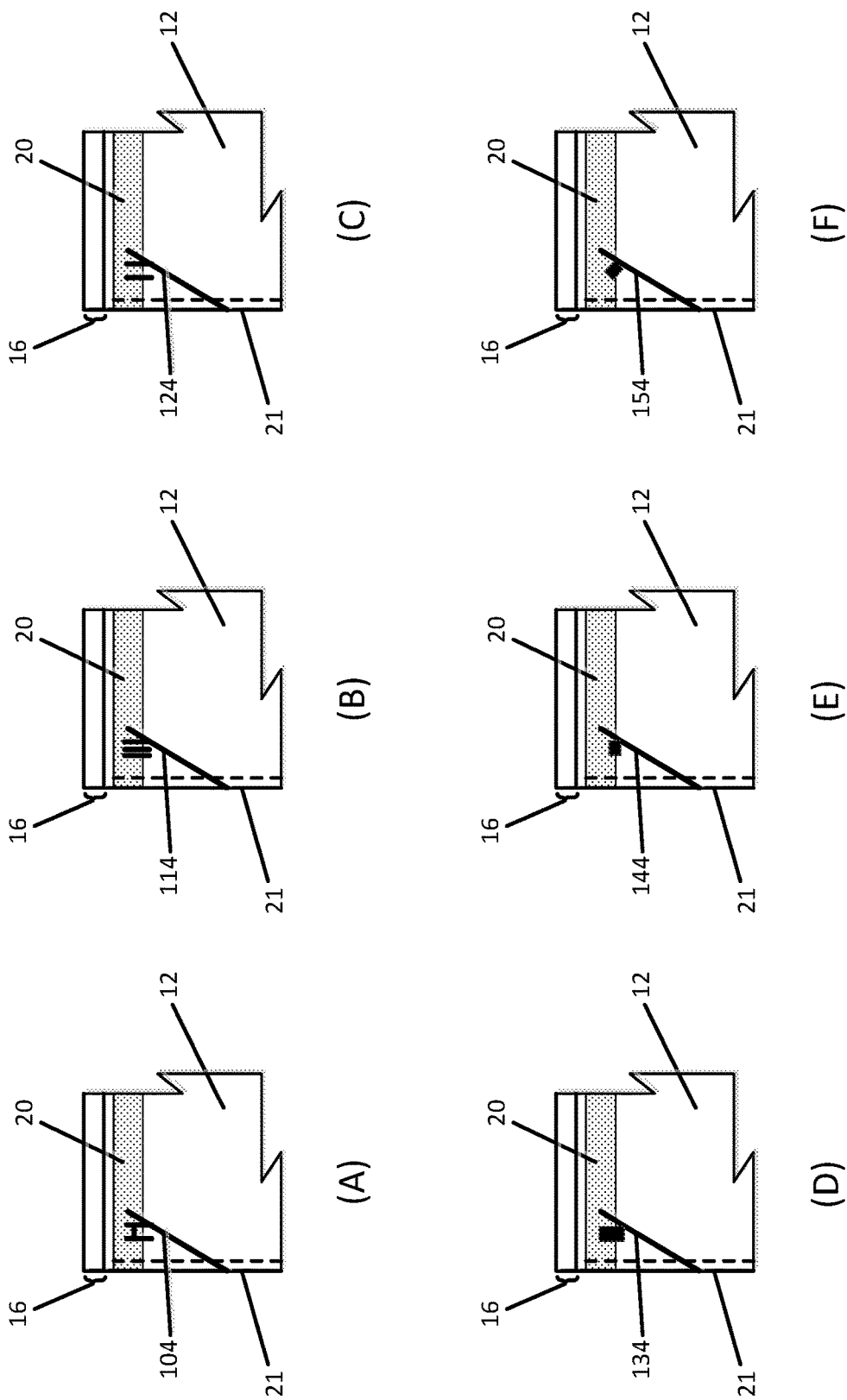

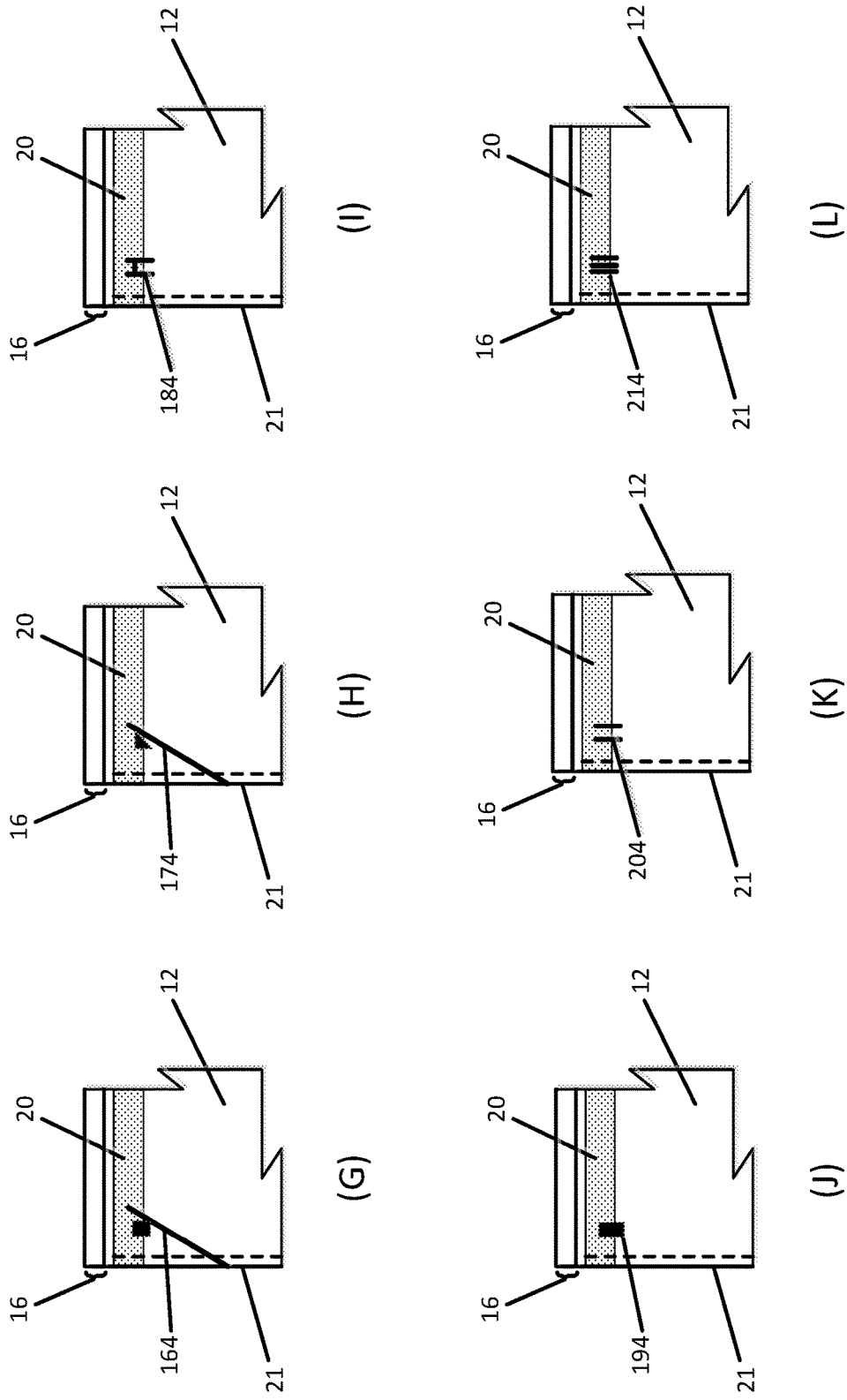

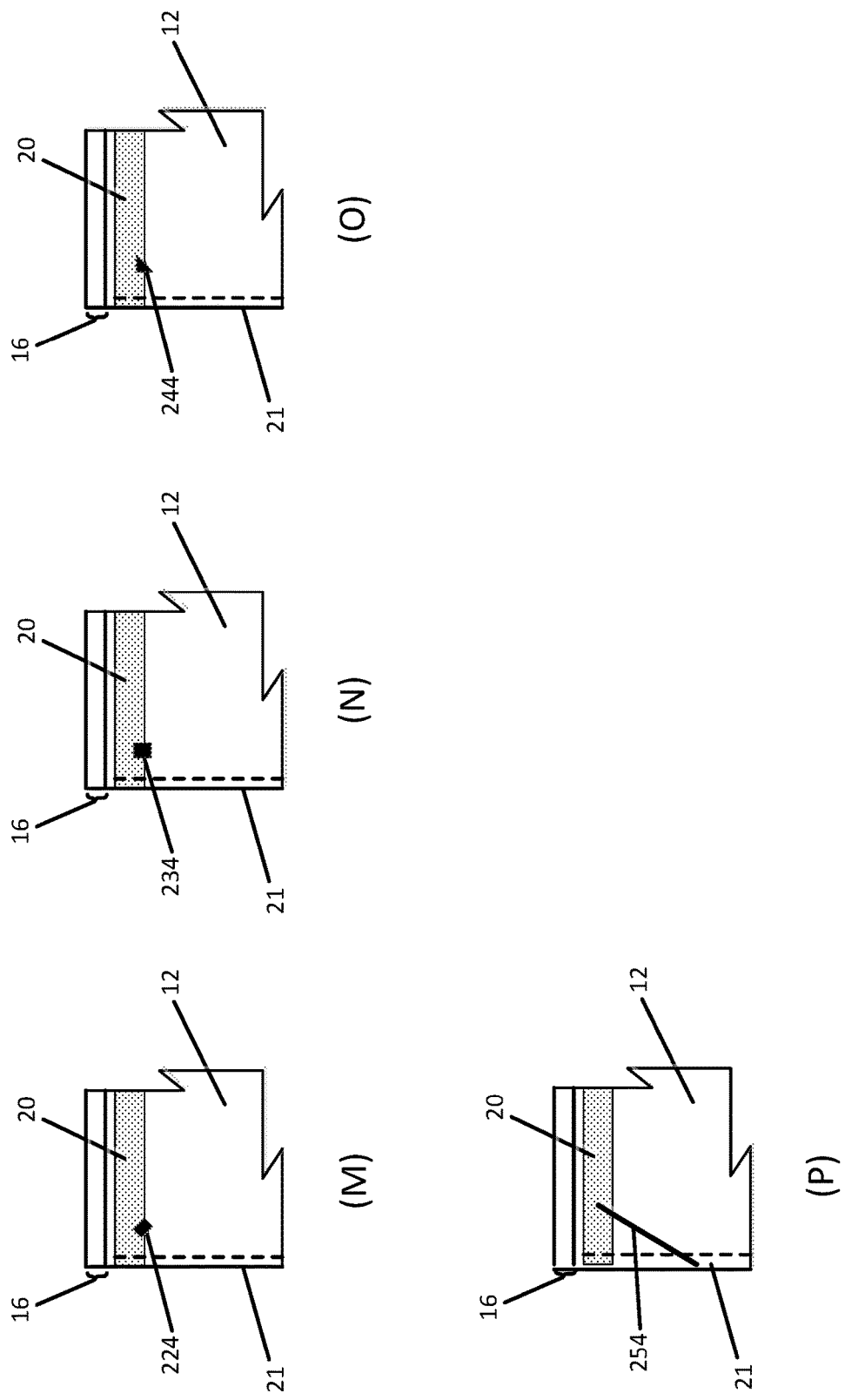

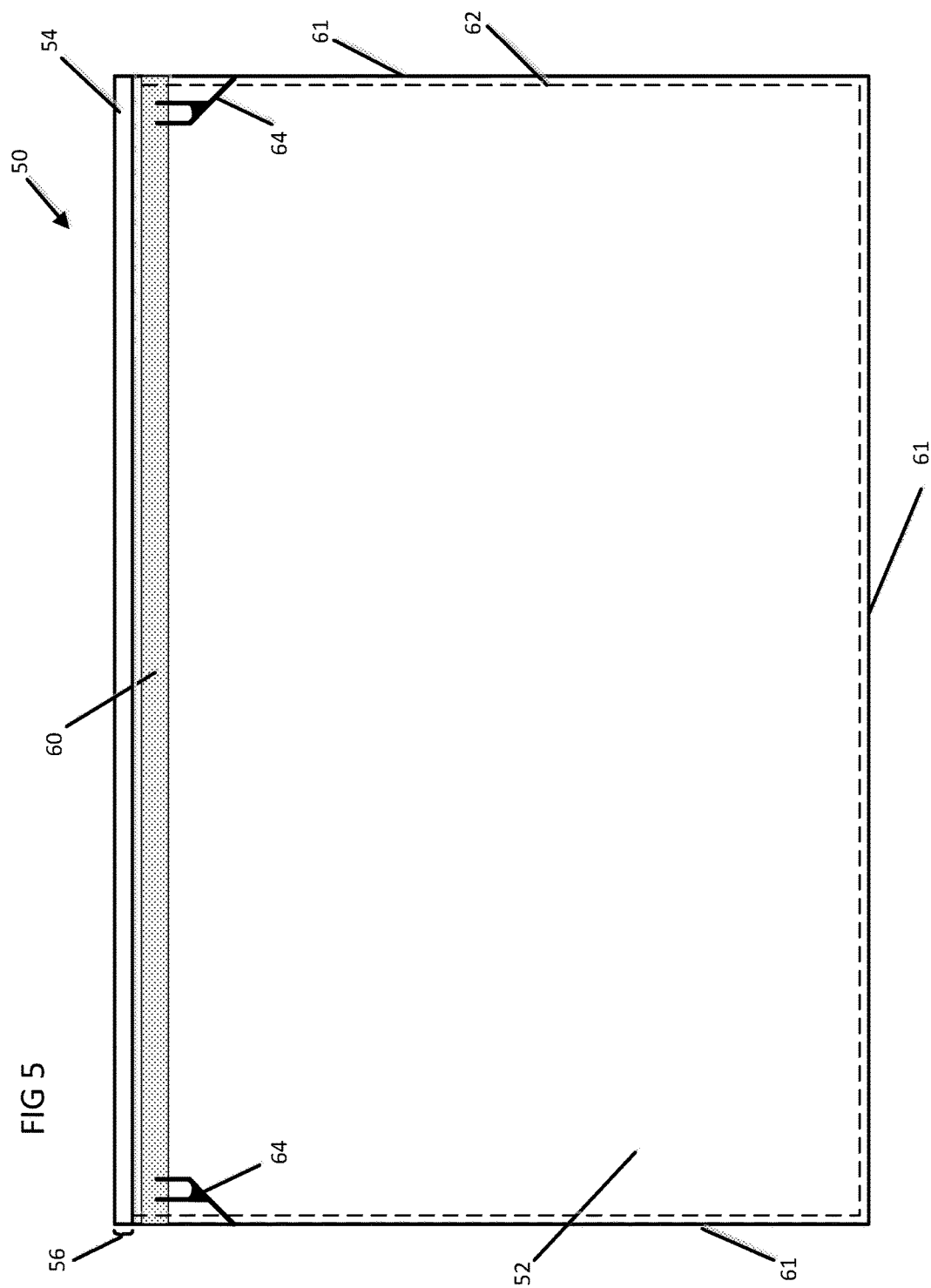

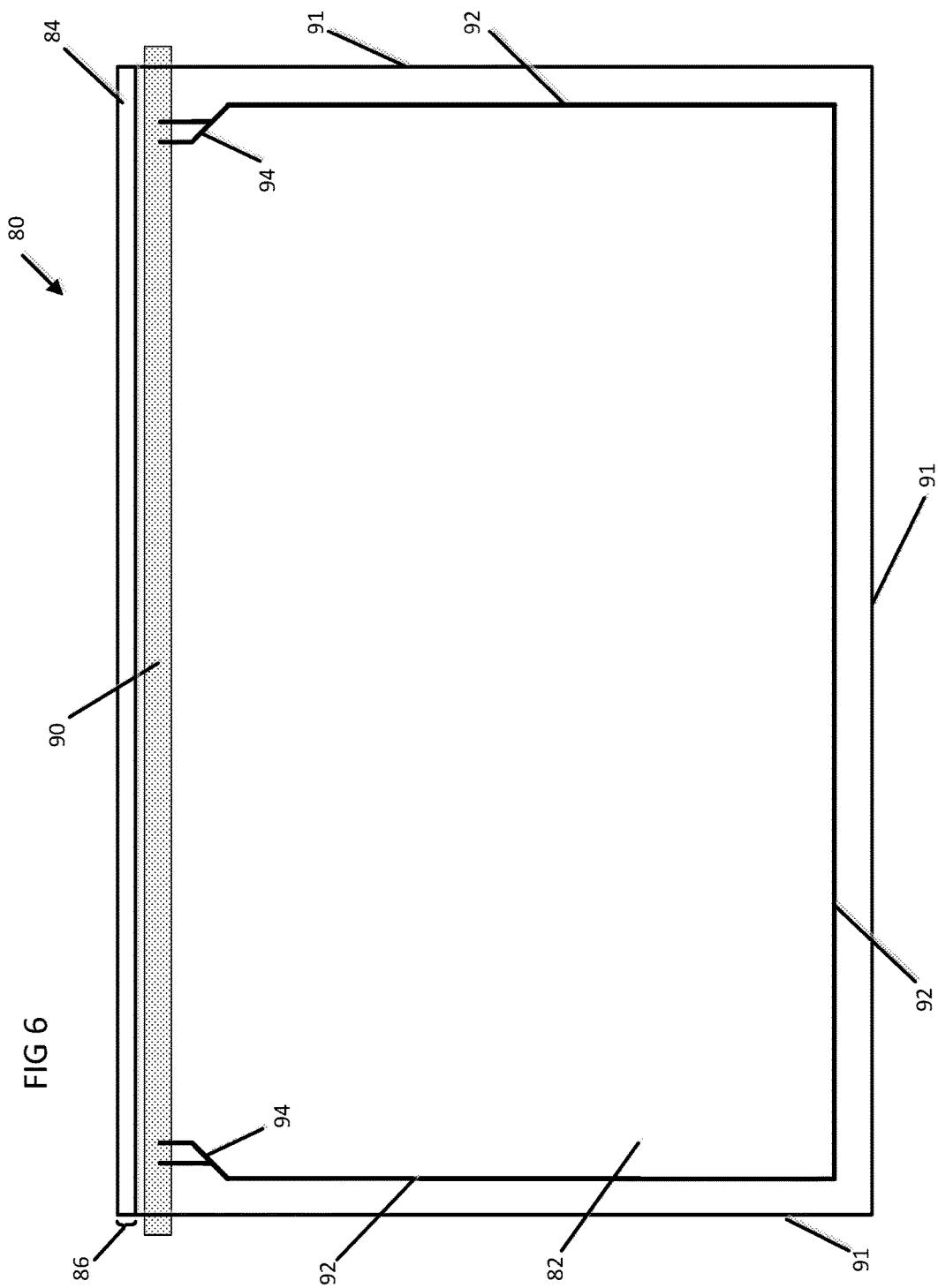

REMOVABLE AND REUSABLE PROTECTIVE ENVELOPE TO DISPLAY DOCUMENT

CROSS-REFERENCE TO RELATED APPLICATIONS

This application claims priority to U.S. Provisional Application Ser. No. 62/597,019, filed Dec. 11, 2017, Ser. No. 62/545,715, filed Aug. 15, 2017, Ser. No. 62/541,336, filed Aug. 4, 2017, and Ser. No. 62/458,192, filed Feb. 13, 2017, the contents of which are incorporated herein by reference in their entirety.

FIELD OF THE INVENTION

The present invention relates generally to document holders, and more specifically to removable and reusable holders for displaying documents.

BACKGROUND

Car dealers are required by federal and state law to display informational labels prominently on new and used vehicles offered for sale. Such labels include Monroney labels, used car buyers guides, vehicle addendum labels, and the like. Such labels are typically printed on stickers that are affixed to one of a vehicle's door windows. Such labels are typically placed on the inside of the window for protection from the weather (wind, rain, etc.).

Unfortunately, the conventional stickers and placement thereof have several drawbacks. Vehicle door windows are often tinted dark, which makes it difficult, or impossible to read stickers on the inside of the window. The stickers must use a strong enough adhesive to remain securely affixed to the window as the window is raised and lowered, but such a strong adhesive can make it difficult for a dealer or a buyer to remove the stickers. While removing the stickers and or labels, the stickers or labels often tear and leave a residue on the window, resulting in additional costs in cleanup and replacement of the stickers or labels. When the windows are operated, the labels and their sleeves tear and this has led to the dealers often asking that the windows not be operated by the buyers, or the dealerships will often lock the windows so that they cannot be operated by the buyers. The stickers must be printed on specialty stock with the required adhesive, which makes the stickers quite expensive to produce and the stickers must be procured from a source that is capable of printing such custom work.

BRIEF SUMMARY OF THE DISCLOSURE

In one embodiment of the invention, a device for displaying a document comprises a front transparent planar sheet and a rear planar sheet, each sheet having three edges that are coterminous with and permanently affixed to a corresponding edge of the other sheet, thereby forming an envelope having three sealed edges and an open end. The device further comprises an adhesive strip affixed to either the front sheet or the rear sheet and positioned across the open end between the front and rear sheets to selectively seal the open end, a protective strip removably affixed to the adhesive strip to prevent the open end from sealing when the protective strip is in place on the adhesive strip and to enable the open end to be sealed when the protective strip is removed from the adhesive strip, an interior edge seal positioned interiorly to the three sealed edges, thereby forming a double edge seal along the three sealed edges, and a first corner seal and a second corner seal, each extending onto but not all the way through the adhesive strip on opposite ends of the open end.

The first and second corner seals may each extend (i) from an adjacent one of the sealed edges, (ii) from an adjacent portion of the interior edge seal, or (iii) from an adjacent end of the interior edge seal onto but not all the way through the adhesive strip. The first and second corner seals may each comprise a first portion extending at an angle (i) from the adjacent one of the sealed edges, (ii) from the adjacent portion of the interior edge seal, or (iii) from the adjacent end of the interior edge seal, and at least one second portion extending from the first portion onto but not all the way through the adhesive strip. The first portion of each of the first and second corner seals may extend perpendicularly (i) from the adjacent one of the sealed edges, (ii) from the adjacent portion of the interior edge seal, or (iii) from the adjacent end of the interior edge seal. The at least one second portion of each of the first and second corner seals may extend from its respective first portion perpendicularly to a longitudinal axis of the adhesive strip. The at least one second portion of each of the first and second corner seals may comprise two parallel second portions.

The protective strip may extend beyond one or both ends of the adhesive strip when the protective strip is in place on the adhesive strip.

The device may further comprise an adhesive applied to the rear sheet on a side opposite the front sheet.

In alternative embodiments of the invention, a method of displaying a document on a motor vehicle comprises (a) inserting a document into a device for displaying a document (as described above), (b) removing the protective strip from the adhesive strip and pressing the front and rear sheets together along the protective strip to seal the open end, and (c) affixing the device to either an exterior side or an interior side of a window of a motor vehicle such that the rear sheet is against the window. The method may further comprise removing a protective covering from an adhesive applied to the rear sheet on a side opposite the front sheet prior to affixing the device to the window.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings:

FIGS. 1 and 2 are, respectively, rear and front exploded perspective views of a removable and reusable protective document holder, in accordance with embodiments of the present invention.

FIG. 3 is a front view of the document holder of FIGS. 1 and 2.

FIGS. 4A-P illustrate several different corner seal configurations of embodiments of the invention.

FIG. 5 is a front view of a removable and reusable protective document holder, in accordance with alternative embodiments of the present invention.

FIG. 6 is a front view of a removable and reusable protective document holder, in accordance with alternative embodiments of the present invention.

DETAILED DESCRIPTION OF THE DISCLOSURE

Figure 1:
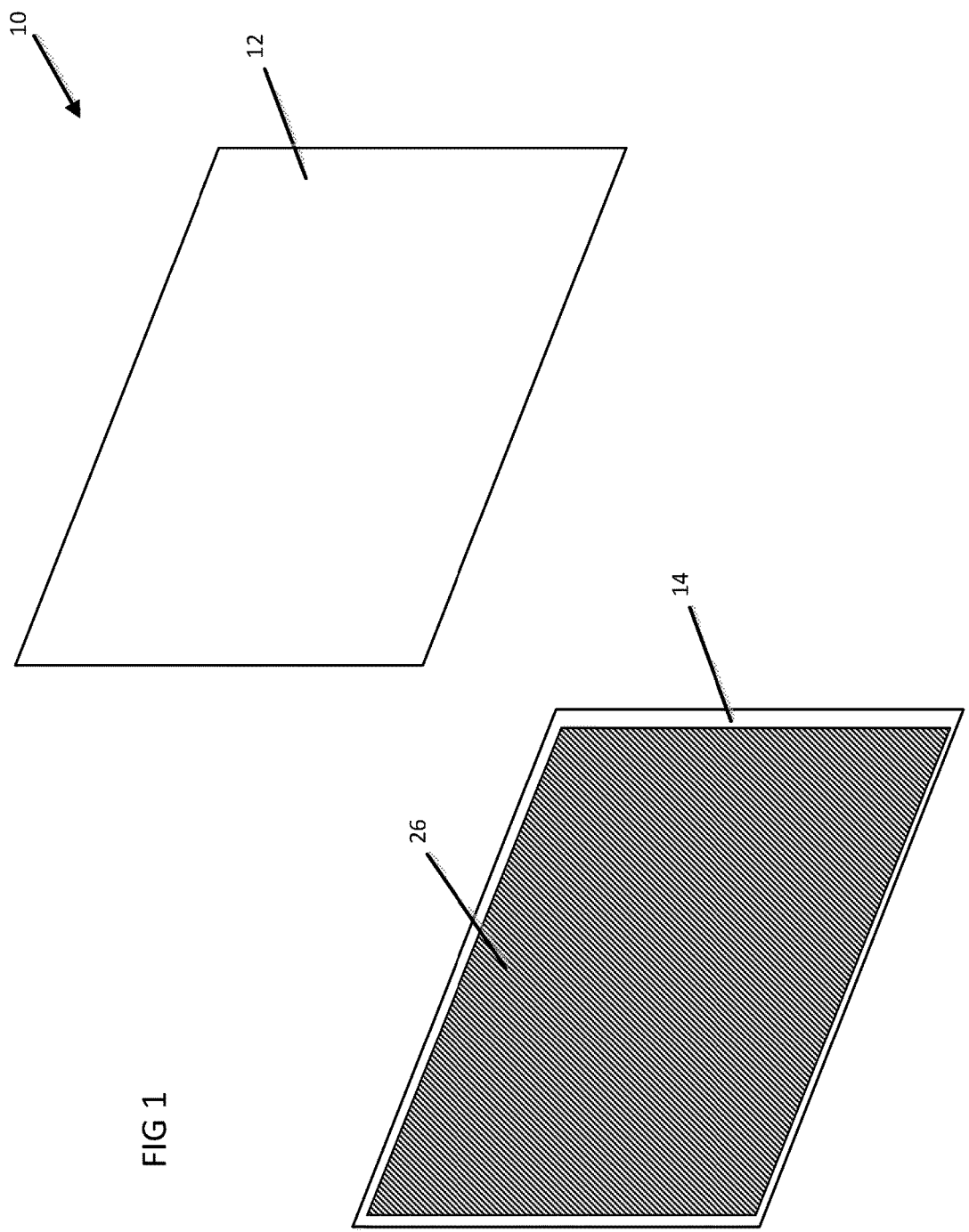

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention are directed to a protective envelope for displaying documents, such as vehicle stickers and labels as described above. The protective envelope of embodiments of the invention fully encloses the document (typically one document in each envelope, although more than one document could be placed in an envelope) to protect the document from damage due to weather (rain, snow, wind, etc.), airflow resulting from movement of the vehicle, friction damage from the operation of lowering and raising the vehicle window, and the like. The protective envelope of embodiments of the invention comprises a sleeve into which a document may be inserted via a resealable opening. The resealable opening advantageously enables the document to be removed and replaced as needed. A reusable adhesive enables the resealable opening to be securely closed to keep out weather and enables the resealable opening to be readily opened as needed to insert or remove a document. In fact, the reusable adhesive enables repeated opening and closing of the resealable opening without losing the ability to effectively seal the opening when closed.

Importantly, the protective envelope of embodiments of the invention may be waterproof to an IPX7 rating when the opening is sealed, thereby protecting the document within. It is believed that no other known document display envelope is waterproof to an IPX7 rating.

The protective envelope of embodiments of the invention is selectively affixable to a vehicle window (and other similar surfaces) and selectively removable therefrom. A reusable adhesive enables the selective affixation and removal of the protective envelope. The reusable adhesive enables the protective envelope to remain securely affixed to a window or like surface, but to also be readily removed without leaving behind adhesive residue. In fact, the reusable adhesive enables repeated affixing and removal of the protective envelope without losing the ability to remain securely affixed to a window or like surface.

The low profile and secure construction of the protective envelope of embodiments of the invention enables the protective envelope to remain securely affixed to a window as the window is repeatedly opened and closed.

The protective envelope of embodiments of the invention may be constructed in any desired size, generally depending on the size of the document to be displayed in the envelope. Exemplary embodiments of the invention may have overall dimensions of 32 centimeter (cm)×25.4 cm, 23.2 cm×37 cm, 29.4 cm×45.1 cm, 32 cm×46.8 cm, and 32.4 cm×47.2 cm.

Referring now to the figures wherein like numerals indicate like elements throughout, embodiments of the invention comprise a removable and reusable protective document holder or envelope 10. The protective envelope 10 comprises a front wall 12 constructed of a relatively stiff, transparent sheet of vinyl (polyvinyl chloride or PVC) joined to a rear wall 14 also constructed of a relatively stiff, transparent sheet of vinyl (the rear wall 14 need not necessarily be transparent, however it may be desirable to use the same material for both the front and rear walls), thereby forming a sleeve. In one embodiment of the invention, the front wall 12 and rear wall 14 are constructed of a vinyl laminating sheet, such as a multi-layered 3 mil vinyl low heat rolled film laminating sheet manufactured by plastic film companies such as Armin Innovative Products Inc, or the like. In another embodiment of the invention, the front wall 12 and rear wall 14 are constructed of a 0.18 millimeter thick PVC sheet. One or both of the front and rear walls may include UV protection, either as a coating or incorporated into the vinyl.

The rear wall 14 may be longer (or taller) on one side than the front wall 12 to form a tab 16 that facilitates opening the resealable opening. (Alternatively, the front wall 12 may be longer (or taller) on one side than the rear wall 14 to form a tab that facilitates opening the resealable opening.) The figures illustrate an elongated tab that runs the entire length of one side. However, one or more smaller tabs may alternatively be formed. In one exemplary embodiment of the invention, the front wall is 6 millimeters (mm) inches longer than the rear wall, such that the tab is 6 mm tall.

As described above, the protective envelope 10 is selectively affixable to a vehicle window (and other similar surfaces) and selectively removable therefrom. A reusable adhesive enables the selective affixation and removal of the protective envelope 10. The back surface of the rear wall 14 sits against the glass of the vehicle window when the envelope is affixed thereto. A reusable adhesive 26 is applied on the back surface of the rear wall 14, as illustrated in FIG. 1. As seen in FIG. 1, reusable adhesive 26 comprises a large sheet that covers most or all of the back surface of the rear wall 14. FIG. 1 illustrates a gap around the perimeter of the reusable adhesive 26 for clarity, such that the entire rear wall 14 is not covered. However, it may be desirable to have the reusable adhesive 26 extend as close to the perimeter of the rear wall as possible to ensure that the edges of the envelope 10 adhere to the window to ensure that the window can be lowered and raised without disturbing the envelope. The adhesive used to secure the envelope to a vehicle window may be a transparent adhesive, which would enable the document to be visible either through the front wall or the back wall of the envelope.

The reusable adhesive 26 is preferably selected such that there is a strong bond (permanent or near permanent) between the reusable adhesive 26 and the back side of the rear wall 14, thereby enabling the protective envelope to be repeatedly affixed to and removed from the window without the reusable adhesive 26 pulling away from the rear wall. To protect the surface of the reusable adhesive 26 during packing, shipping, and storage, a peelable film or paper (not illustrated), typically comprising a low surface paper, is placed over the reusable adhesive 26 so that the reusable adhesive 26 maintains its adhesive properties until the protective envelope is to be affixed to a vehicle, at which point the user may remove the peelable film. In one exemplary embodiment of the invention, the reusable adhesive 26 is a high temperature, removable adhesive roll, such as Tesa Tape 2262 from Tesa Tape, Inc. or an equivalent (such an equivalent may be applied at about 60 grams per square meter with a gumming thickness of about 24-27 micrometers.

Alternatively (not illustrated), the reusable adhesive for affixing the protective envelope to the window may be applied at the edges of the back surface of the rear wall. In such an alternative embodiment, the reusable adhesive may be applied to the back surface of the rear wall in a relatively thin strip (e.g., 6 mm) around the perimeter. In other alternative embodiments of the invention, the reusable adhesive may be affixed to the back surface of the rear wall in other arrangements.

A low density foam seal strip 18, such as Tesa Tape 04914 or an equivalent (such an equivalent may have a width of 12 mm and a thickness of 0.08 mm), is applied to the front side of the rear wall 14 (the front side of the rear wall 14 eventually becomes the inside of the protective envelope, along with the back side of the front wall 12). The seal strip 18 is positioned along the edge that will become the opening of the protective envelope. The seal strip is preferably selected such that a strong bond (permanent or near permanent) is formed between the seal strip and the front side of the rear wall. A removable protective strip 20 is placed on top of the seal strip 18, which enables the seal strip to maintain its adhesive properties and prevents the opening from being sealed until a user is ready to seal the protective envelope and pulls off the removable strip 20. The removable protective strip 20 may be made from a soft PVC liner material, such as a 0.002" thick PVC liner protective peel strip for adhesive stripping, or from a 0.06 mm thick PET peel strip. A paper removable strip or the like will not provide the desired bonding described below.

The seal strip 18 is positioned parallel to the edge, and far enough away from the edge so that the seal strip 18 is fully covered by the front wall 12 when the front and rear walls are joined (as described below) (this is seen in FIG. 3, in which the seal strip (covered by a protective strip 20) is slightly below the top edge of the front wall 12).

After the seal strip 18 is affixed to the rear wall 14 and covered by the protective strip 20, the front wall 12 and the rear wall 14 are positioned together with three edges (bottom and side edges in the figures) aligned (the fourth edge is not aligned because the front wall 12 is shorter than the rear wall 14) and placed together into a high frequency radio wave (HFRW) machine to heat seal and bond the walls together. The HFRW machine uses the necessary size and configuration brass electrodes to create the seals described below. A HFRW machine will not seal or bond any material that is not PVC based. A specially designed tool creates all the bonds described below, and cuts the protective envelope to size. Importantly, all the bonding and cutting is done at the same time.

The three sides that do not form the opening (left, right, and bottom in FIG. 3) are heat sealed at and slightly inward from the edges of the combined front and back walls. At the end of the process, the sleeve is then die cut to size. The die cutter has a heated knife edge which heat seals the outermost edge of the three sides. This provides a double seal around these three sides—one seal 21 at the outermost edge and one seal 22 about 1 mm from the edge (shown in dashed line for clarity)—which further improves the weatherproofing and waterproofing of the envelope.

In conventional PVC pockets or sleeves, edge seals are provided on the very extreme edges of the PVC sheets. Such conventional edge seals are weak and prone to failure. The double edge sealing (including cutting to size with a heated knife edge to seal the outer edges) of the embodiments of the invention provide nearly edge-to-edge coverage, without the shortcomings of conventional edge seals.

As seen in FIG. 3, F-shaped seals 24 are formed at the corners where the seal strip and cover 18, 20 meets the side edges. Each seal 24 has a first portion extending inward from the side edges below (i.e., opposite the opening) the seal strip and cover 18, 20 and two spaced-apart second portions extending from the first portion into (but, importantly, not through) the seal strip and cover 18, 20. Each first portion may extend generally perpendicular from its respective edge and be generally parallel to the seal strip and cover 18, 20 as shown, or may be at a different angle. The second portions may extend upward (i.e., toward the opening) generally perpendicular from their respective first portions (and be generally perpendicular to the seal strip and cover 18, 20) as shown, or may be at different angles. The second portions of each seal 24 may be generally parallel to each other as shown, or may be at different angles. Each seal 24 may have two second portions as shown, or may each have one second portion or more than two second portions. The spacing between the second portions of each seal 24 is exaggerated in FIG. 3 for clarity, and would typically be closer together and closer to the respective side edges to maximize the size of the opening of the envelope.

The F-shaped seals 24 prevent water from tunneling into the envelope along edges of the seal strip. It is important that the second portions do not extend all the way through the seal strip and cover 18, 20, as that would create an opportunity for water to tunnel along the second portions into the envelope. In the illustrated embodiment, the second portions of the seals 24 extend from the first portion about half way into the seal strip and cover 18, 20 (although this may vary somewhat, it is desirable to have a significant portion of the seal strip and cover 18, 20 above the end of the second portions to ensure that the seal strip 18 seals the front and back walls sufficiently at these points). In one specific embodiment of the invention, the seal strip and cover 18, 20 are about 10-12 mm wide and the second portions extend about 5-6 mm into the seal strip and cover 18, 20. The heat sealing electrodes used to create the F-shaped seals 24 are typically larger than the electrodes used to create the edge seals 22.

The use of a PVC liner to create the cover 20 results in a different type/quality of seal for the part of the F-shaped seal 24 that is within the seal strip and the part of the F-shaped seal 24 that is below the seal strip. The part of the F-shaped seal 24 that is below the seal strip is a permanent, solid-state bond that cannot be separated without damaging the envelope. The part of the F-shaped seal 24 that is within the seal strip can be separated and re-sealed (as described below). The process of creating the F-shaped seals creates corresponding indentations (in the F-shapes) in the front wall 12 and the rear wall 14, which aid in the re-sealing of the part of the F-shaped seal 24 that is within the seal strip.

To seal the envelope, a user grasps the seal strip cover 20 about at its midpoint and pulls the cover 20 away from the seal strip 18, taking care to ensure that the opposing ends of the cover 20 are pulled entirely out of the F-shaped seal 24. This temporarily breaks the part of the F-shaped seal 24 that is within the seal strip. The opening is then sealed by the user pressing down on the front and/or rear walls along the seal strip and especially pressing down on the two F-shaped seals 24 to re-seal the F-shaped seals 24.

When the protective strip is removed and the opening is sealed, the protective envelope of embodiments of the invention may be waterproof to an IPX7 rating.

A heat sealing and cutting tool (not illustrated) is used for constructing the document holder of FIGS. 1 and 2. The tool comprises a generally rectangular (although other shapes may be used) main body with a heated knife edge around the entire main body for creating the outermost edge seal and cutting the protective envelope 10 to size, an edge seal electrode for creating edge seal 22, and an electrode for creating the F-shaped seal 24. The edge seal electrode would not extend around the entire main body, as the top corners (above the F-shaped seal) and the top edge of the protective envelope 10 do not have an edge seal.

In addition to the F-shaped corners seals described above, many different corner seal configurations may be possible. FIGS. 4A-P illustrate several different possible corner seal configurations that may be used for the document holder of embodiments of the invention. For simplicity, FIGS. 4A-P illustrate only the upper left corner of the document holder. The corner seal on the upper right corner would typically be a mirror image. FIGS. 4A-P illustrate, respectively, alternative corner seals 104, 114, 124, 134, 144, 154, 164, 174, 184, 194, 204, 214, 224, 234, 244, and 254.

FIG. 5 is a front view of a removable and reusable protective document holder 50, in accordance with alternative embodiments of the present invention. As in the embodiment of FIGS. 1-3, the protective envelope 50 of FIG. 5 comprises a front wall 52 joined to a rear wall 54. The rear wall 54 is longer (or taller) on one side than the front wall 52 to form a tab 56 that facilitates opening the resealable opening. A reusable adhesive (not illustrated) is applied on the back surface of the rear wall 54. A low density foam seal strip (not illustrated as the seal strip is behind the protective strip 60 in FIG. 6) is applied to the front side of the rear wall 54. The seal strip is positioned along (at or near) the edge that will become the opening of the protective envelope. Prior to applying the seal strip, the location where the seal strip is to be applied is primed to allow the seal strip to permanently bond to the rear wall 54. A removable protective strip 60 is placed on top of the seal strip, which enables the seal strip to maintain its adhesive properties and prevents the opening from being sealed until a user is ready to seal the protective envelope and pulls off the removable strip 60. The three sides that do not form the opening (left, right, and bottom in FIG. 5) are heat sealed at and slightly inward from the edges of the combined front and back walls. At the end of the process, the sleeve is then die cut to size. The die cutter has a heated knife edge which heat seals the outermost edge of the three sides. This provides a double seal around these three sides—one seal 61 at the outermost edge and one seal 62 about 1 mm from the edge (shown in dashed line for clarity)—which further improves the weatherproofing and waterproofing of the envelope.

As seen in FIG. 5, corner seals 64 are formed at the corners where the seal strip (not illustrated) and cover 60 meet the side edges. Each corner seal 64 has a first portion extending inward from the respective side edge below (i.e., opposite the opening) the seal strip (not illustrated) and cover 60 and two spaced-apart second portions extending from the first portion into (but, importantly, not through) the seal strip (not illustrated) and cover 60. In this alternative embodiment, the first portion extends upward and inward from its respective edge, and is therefore at an angle to its respective side edge and to the seal strip (not illustrated) and cover 60 as shown. The angle will typically be between about 30 and 60 degrees relative to the respective side edge, however any suitable angle may be used. The second portions may extend upward (i.e., toward the opening) generally vertically from their respective first portions (and be generally perpendicular to the seal strip (not illustrated) and cover 60) as shown, or may be at different angles. The second portions of each corner seal 64 may be generally parallel to each other as shown, or may be at different angles. Each corner seal 64 may have two second portions as shown, or may each have one second portion or more than two second portions. The spacing between the second portions of each corner seal 64 is exaggerated in FIG. 5 for clarity, and would typically be closer together and closer to the respective side edges to maximize the size of the opening of the envelope.

A heat sealing and cutting tool (not illustrated) is used for constructing the alternative document holder of FIG. 5. The tool comprises a generally rectangular (although other shapes may be used) main body with a heated knife edge around the entire main body for creating the outermost edge seal and cutting the protective envelope 50 to size, an edge seal electrode for creating edge seal 62, and an electrode for creating the corner seal 64. The edge seal electrode would not extend around the entire main body, as the top corners (above the corner seal) and the top edge of the protective envelope 50 do not have an edge seal.

FIG. 6 is a front view of a removable and reusable protective document holder 80, in accordance with alternative embodiments of the present invention. As in the embodiment of FIGS. 1-3 and 5, the protective envelope 80 of FIG. 6 comprises a front wall 82 joined to a rear wall 84. The rear wall 84 is longer (or taller) on one side than the front wall 82 to form a tab 86 that facilitates opening the resealable opening. A reusable adhesive (not illustrated) is applied on the back surface of the rear wall 84. A low density foam seal strip (not illustrated as the seal strip is behind the protective strip 90 in FIG. 6) is applied to the front side of the rear wall 84. The seal strip is positioned along (at or near) the edge that will become the opening of the protective envelope. Prior to applying the seal strip, the location where the seal strip is to be applied is primed to allow the seal strip to permanently bond to the rear wall 84. A removable protective strip 90 is placed on top of the seal strip, which enables the seal strip to maintain its adhesive properties and prevents the opening from being sealed until a user is ready to seal the protective envelope and pulls off the removable strip 90. The three sides that do not form the opening (left, right, and bottom in FIG. 6) are heat sealed at the edges of the combined front and back walls. A die cutter which has a heated knife edge both cuts the sleeve to size and heat seals the outermost edges of the three sides, thereby creating outer edge seal 91. This heated knife edge applies enough heat and pressure to seal and cut to size the front wall 82 and the back wall 84, but not cut the protective strip 90 so that the protective strip 90 extends beyond the edges of the envelope 80 as seen in FIG. 6, thereby making the protective strip 90 easier to grasp and pull off by a user.

To seal the envelope, a user grasps either extended end of the seal strip cover 90 and pulls the cover 90 away from the seal strip, taking care to ensure that the cover 90 is pulled entirely out of the corner seals 94. This temporarily breaks the part of each corner seal 94 that is within the seal strip. The opening is then sealed by the user pressing down on the front and/or rear walls along the seal strip and especially pressing down on the corner seals 94 to re-seal the corner seals 94.

Typically at the same time as the outer edge seal 91 is created, an inner edge seal 92 is created (typically via heat sealing) along the three sides that do not form the opening. In exemplary embodiments of the invention, the inner edge seal 92 is about 10-12 mm spaced apart from the outer edge seal 91 (although a greater or lesser spacing may be used). The space between the inner edge seal 92 and the outer edge seal 91 is typically not sealed. This provides a double seal around these three sides which further improves the weatherproofing and waterproofing of the envelope.

As seen in FIG. 6, corner seals 94 are formed at the corners where the seal strip (not illustrated) and cover 90 meet the side edges. Unlike the embodiment of FIGS. 1-3 and 5, the corner seals 94 of the embodiment of FIG. 6 are contiguous with the inner edge seal 92. Each seal 94 has a first portion extending inward from the respective end of the inner edge seal 92 below (i.e., opposite the opening) the seal strip (not illustrated) and cover 90 and two spaced-apart second portions extending from the first portion into (but, importantly, not through) the seal strip (not illustrated) and cover 90. In this alternative embodiment, the first portion extends upward and inward from its respective end of the inner edge seal 92, and is therefore at an angle to its respective side edge and to the seal strip (not illustrated) and cover 90 as shown. The angle will typically be between about 30 and 60 degrees relative to the respective side edge, however any suitable angle may be used. The second portions may extend upward (i.e., toward the opening) generally vertically from their respective first portions (and be generally perpendicular to the seal strip (not illustrated) and cover 90) as shown, or may be at different angles. The second portions of each corner seal 94 may be generally parallel to each other as shown, or may be at different angles. Each corner seal 94 may have two second portions as shown, or may each have one second portion or more than two second portions. The spacing between the second portions of each corner seal 94 is exaggerated in FIG. 6 for clarity, and would typically be closer together.

If both the front and rear walls are constructed of transparent material and if the adhesive on the back side of the rear wall (i.e., the side affixed to the window) is transparent, then the protective envelope of embodiments of the invention may be mounted either to the exterior side or to the interior side of a vehicle window and the document within the envelope may still be visible from the exterior of the vehicle (the document would need to be inserted into the envelope facing different directions depending on whether the envelope was to be mounted to the exterior side or to the interior side of a vehicle window).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A device for displaying a document, the device comprising:
    a front transparent planar sheet and a rear planar sheet, each sheet having three edges that are coterminous with and permanently affixed to a corresponding edge of the other sheet, thereby forming an envelope having three sealed edges and an open end;
    an adhesive strip affixed to either the front sheet or the rear sheet and positioned across the open end between the front and rear sheets to selectively seal the open end;
    a protective strip removably affixed to the adhesive strip to prevent the open end from sealing when the protective strip is in place on the adhesive strip and to enable the open end to be sealed when the protective strip is removed from the adhesive strip;
    an interior edge seal positioned interiorly to the three sealed edges, thereby forming a double edge seal along the three sealed edges; and
    a first corner seal and a second corner seal, each extending onto but not all the way through the adhesive strip on opposite ends of the open end.

2. The device of claim 1, wherein the first and second corner seals each extend (i) from an adjacent one of the sealed edges, (ii) from an adjacent portion of the interior edge seal, or (iii) from an adjacent end of the interior edge seal onto but not all the way through the adhesive strip.

3. The device of claim 2, wherein the first and second corner seals each comprise:
    a first portion extending at an angle (i) from the adjacent one of the sealed edges, (ii) from the adjacent portion of the interior edge seal, or (iii) from the adjacent end of the interior edge seal; and
    at least one second portion extending from the first portion onto but not all the way through the adhesive strip.

4. The device of claim 3, wherein the first portion of each of the first and second corner seals extends perpendicularly (i) from the adjacent one of the sealed edges, (ii) from the adjacent portion of the interior edge seal, or (iii) from the adjacent end of the interior edge seal.

5. The device of claim 3, wherein the at least one second portion of each of the first and second corner seals extends from its respective first portion perpendicularly to a longitudinal axis of the adhesive strip.

6. The device of claim 3, wherein the at least one second portion of each of the first and second corner seals comprises two second portions.

7. The device of claim 6, wherein the two second portions are parallel to each other.

8. The device of claim 1, wherein the protective strip extends beyond one or both ends of the adhesive strip when the protective strip is in place on the adhesive strip.

9. The device of claim 1, further comprising an adhesive applied to the rear sheet on a side opposite the front sheet.

10. The device of claim 9, wherein the adhesive applied to the rear sheet on a side opposite the front sheet comprises a transparent adhesive.

11. The device of claim 1, wherein, when the protective strip is removed from the adhesive strip and the open end is sealed, the device is waterproof.

12. The device of claim 11, wherein the device is waterproof to an IPX7 rating.

13. A method of displaying a document on a motor vehicle, the method comprising:
    (a) inserting a document into a device for displaying a document, the device comprising:

a front transparent planar sheet and a rear planar sheet, each sheet having three edges that are coterminous with and permanently affixed to a corresponding edge of the other sheet, thereby forming an envelope having three sealed edges and an open end, wherein the document is inserted through the open end;

an adhesive strip affixed to either the front sheet or the rear sheet and positioned across the open end between the front and rear sheets to selectively seal the open end;

a protective strip removably affixed to the adhesive strip to prevent the open end from sealing when the protective strip is in place on the adhesive strip and to enable the open end to be sealed when the protective strip is removed from the adhesive strip;

an interior edge seal positioned interiorly to the three sealed edges, thereby forming a double edge seal along the three sealed edges; and a first corner seal and a second corner seal, each extending onto but not all the way through the adhesive strip on opposite ends of the open end; and (b) removing the protective strip from the adhesive strip and pressing the front and rear sheets together along the protective strip to seal the open end; and (c) affixing the device to a window of a motor vehicle such that the rear sheet is against the window.

14. The method of claim 13, wherein the first and second corner seals each extend (i) from an adjacent one of the sealed edges, (ii) from an adjacent portion of the interior edge seal, or (iii) from an adjacent end of the interior edge seal onto but not all the way through the adhesive strip.

15. The method of claim 14, wherein the first and second corner seals each comprise:

a first portion extending at an angle (i) from the adjacent one of the sealed edges, (ii) from the adjacent portion of the interior edge seal, or (iii) from the adjacent end of the interior edge seal; and at least one second portion extending from the first portion onto but not all the way through the adhesive strip.

16. The method of claim 14, wherein the first portion of each of the first and second corner seals extends perpendicularly (i) from the adjacent one of the sealed edges, (ii) from the adjacent portion of the interior edge seal, or (iii) from the adjacent end of the interior edge seal.

17. The method of claim 15, wherein the at least one second portion of each of the first and second corner seals extends from its respective first portion perpendicularly to a longitudinal axis of the adhesive strip.

18. The method of claim 15, wherein the at least one second portion of each of the first and second corner seals comprises two second portions.

19. The method of claim 18, wherein the two second portions are parallel to each other.

20. The method of claim 13, wherein the protective strip extends beyond one or both ends of the adhesive strip when the protective strip is in place on the adhesive strip.

21. The method of claim 13, further comprising removing a protective covering from an adhesive applied to the rear sheet on a side opposite the front sheet prior to affixing the device to the window.

22. The method of claim 21, wherein the adhesive applied to the rear sheet on a side opposite the front sheet comprises a transparent adhesive.

23. The method of claim 13, wherein, when the protective strip is removed from the adhesive strip and the open end is sealed, the device is waterproof.

24. The method of claim 23, wherein the device is waterproof to an IPX7 rating.

* * * * *